United States Patent [19]

Hollander, Jr.

[11] 4,363,205

[45] Dec. 14, 1982

[54] PACKAGING METHOD

[75] Inventor: Edward F. Hollander, Jr., Broomall, Pa.

[73] Assignee: John P. Glass, Essington, Pa.

[21] Appl. No.: 739,475

[22] Filed: Nov. 8, 1976

[51] Int. Cl.³ .......................... B65B 3/16; B65B 3/18; B65B 31/06; B65B 51/22

[52] U.S. Cl. ......................................... 53/434; 53/469; 53/477; 141/5; 141/8; 141/113; 206/820

[58] Field of Search ................. 53/28, 29, 35, 37, 39, 53/183, 179, 180 R, 180 M, 181, 373, 21 FC; 141/8, 113, 31, 67, 5, 327; 206/820; 156/73.1, 580.1; 229/53

[56] References Cited

U.S. PATENT DOCUMENTS

| | | | |
|---|---|---|---|
| 700,806 | 5/1902 | Paine | 53/39 X |
| 1,397,631 | 11/1921 | Goodchild | 141/31 X |
| 2,277,783 | 3/1942 | Scharf | 53/183 |
| 2,430,995 | 11/1947 | Roos | 53/39 X |
| 2,530,400 | 11/1950 | Rado | 53/21 FC |
| 2,959,902 | 11/1960 | Heller et al. | 53/180 |
| 3,206,908 | 9/1965 | Bodet | 53/37 |
| 3,263,901 | 8/1966 | Hoelzer | 229/53 |
| 3,282,020 | 11/1966 | Smith | 53/180 M |
| 3,307,324 | 3/1967 | Roehm | 53/181 |
| 3,374,363 | 10/1967 | Dykes et al. | 53/28 X |
| 3,531,908 | 10/1970 | Rausing et al. | 53/37 |
| 3,651,615 | 3/1972 | Bohner et al. | 53/28 |
| 3,681,176 | 8/1972 | Reifenhauser et al. | 156/73.1 X |
| 3,748,209 | 7/1973 | Pearson et al. | 53/37 X |
| 3,780,488 | 12/1973 | Herrell | 53/39 X |
| 3,823,055 | 7/1974 | Schulz et al. | 156/580.1 |
| 3,884,011 | 5/1975 | Patton | 53/37 X |

FOREIGN PATENT DOCUMENTS 875456 3/1953 Fed. Rep. of Germany ...... 141/113

Primary Examiner—Horace M. Culver
Attorney, Agent, or Firm—Harding, Earley, Follmer & Frailey

[57] ABSTRACT

A method of making a package having contents comprising the steps of taking a tube of flexible material having a top and a bottom end, ultrasonically sealing a bottom band seal across the tube, inserting the contents into the tube, and ultrasonically sealing an upper band seal across the tube at a location spaced away from the bottom end of the tube, with the contents contained between the upper and bottom band seals.

6 Claims, 19 Drawing Figures

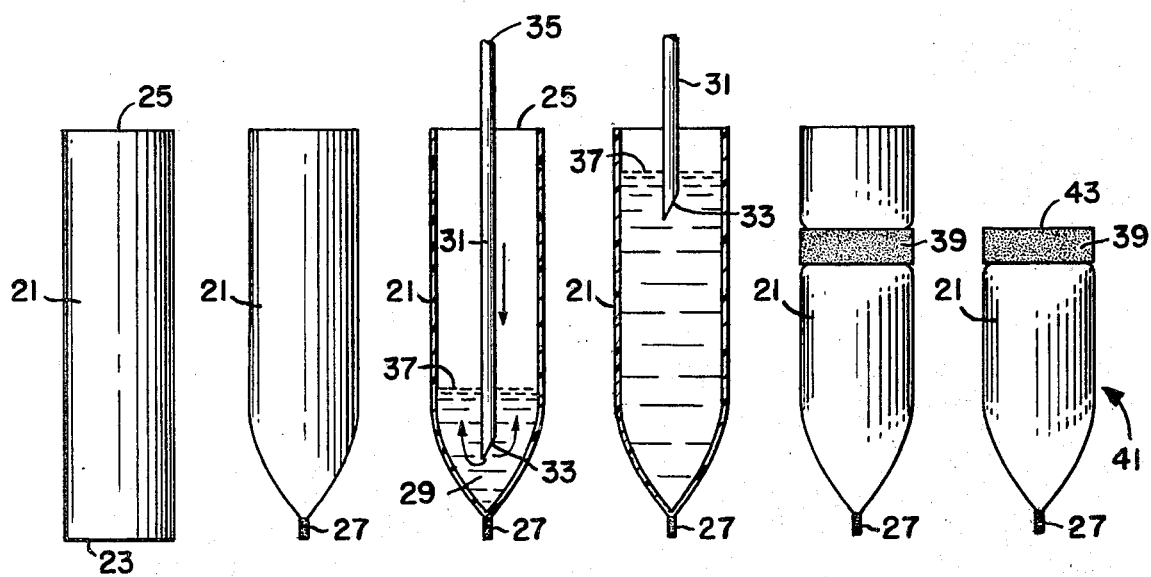
FIG. 1.  FIG. 2.  FIG. 3.  FIG. 4.  FIG. 5.  FIG. 6.
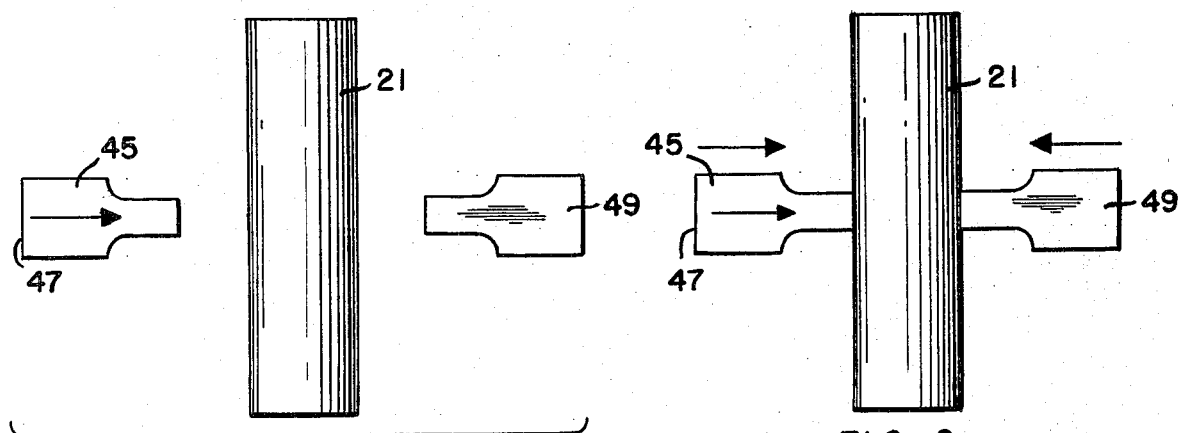
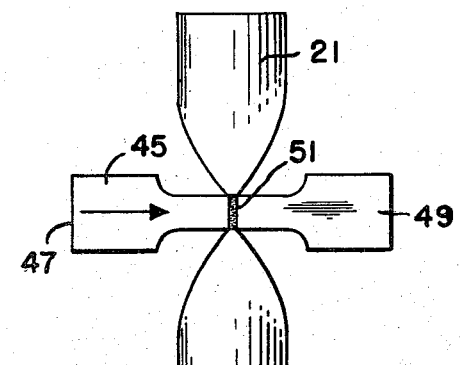
FIG. 7.
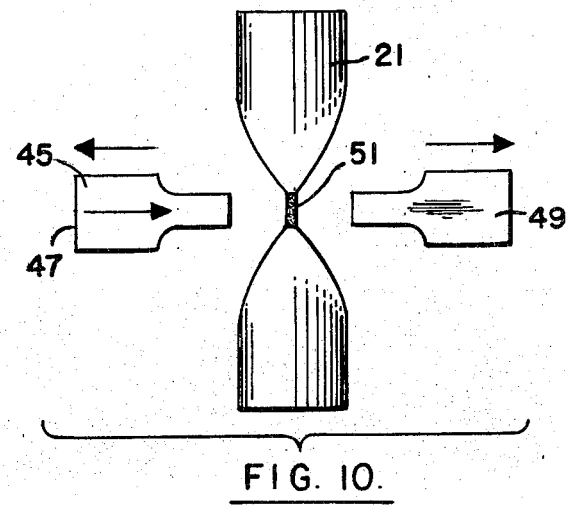
FIG. 8.
FIG. 9.
FIG. 10.

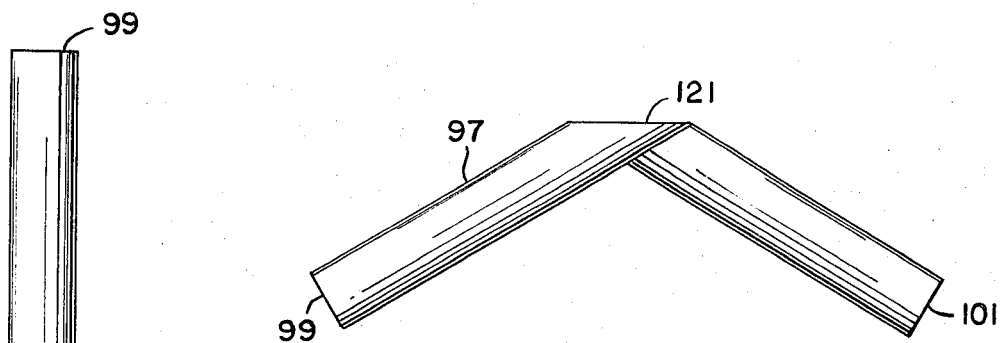
FIG. 14.
FIG. 15.
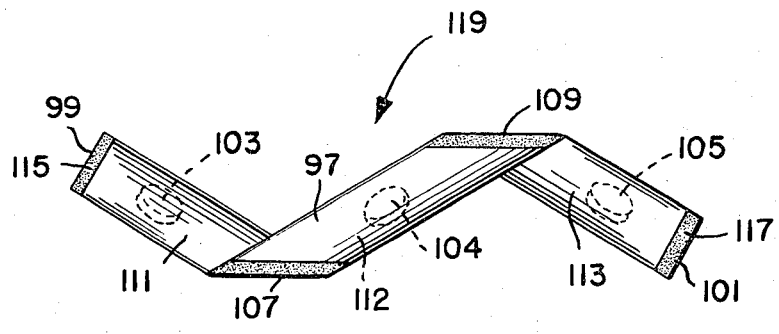
FIG. 16.
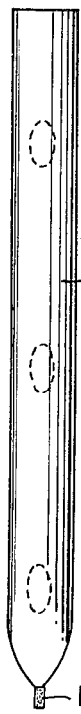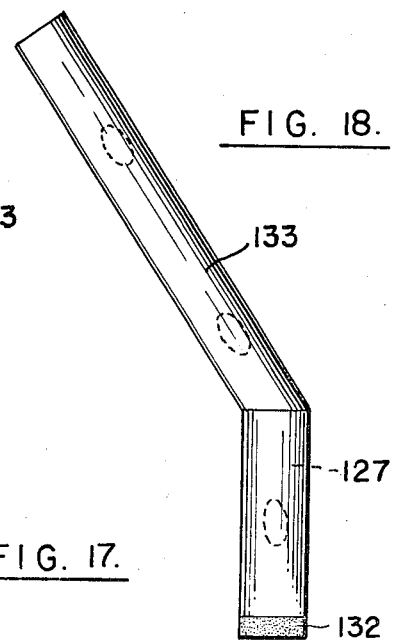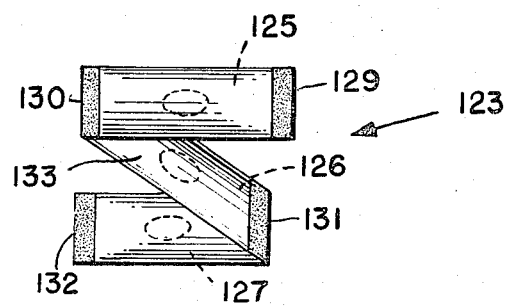
FIG. 18.
FIG. 17.
FIG. 19

PACKAGING METHOD

CROSS REFERENCE TO RELATED APPLICATIONS

This application is related to my following patent applications, all incorporated herein by reference: Ser. No. 720,084, filed Sept. 2, 1976, for PACKAGES, and Ser. No. 739,476, filed Nov. 11, 1976 for PACKAGE and Ser. No. 739,477, filed Nov. 11, 1976 for BATTERY PACKAGE.

BACKGROUND OF THE INVENTION

It has been a problem to provide a method of making a one-shot dispensing package for liquids or solids that is opened by using only one hand, that is not sealed by a somewhat unreliable heat-sealing procedure, that is inexpensive, that permits accurate control of the bursting force of the package seal, that controls the quantity of the package contents, and that does not employ glue or other adhesive to seal food or drugs. Adhesive seals make sterility control difficult or impossible.

It has also been a problem to provide a method of filling a package with liquid which method tends to exclude gas from entering the package during the filling operation, and also removes the gas which was initially in the package and replaces it with the filling liquid.

SUMMARY OF THE INVENTION

These problems are solved in accordance with the method of my invention by taking a tube of flexible material having a top and a bottom end, ultrasonically sealing a bottom band seal across the tube, inserting the contents into the tube, and ultrasonically sealing an upper band seal across the tube at a location spaced away from the bottom end of the tube with the contents contained between the upper and bottom band seals. When the contents are liquid, the contents-inserting step comprises filling the tube with a liquid from the bottom end of the tube so as to exclude gas from the filling-liquid and remove the initial gas which was in the tube.

BRIEF DESCRIPTION OF THE DRAWINGS

FIG. 1 is a view in elevation of a tube of flexible material that is to be made into a package in accordance with the method of my invention;

FIG. 2 is a view showing the tube after the step of ultrasonically sealing the bottom;

FIG. 3 is a view showing the filling step;

FIG. 4 is a view showing the tube almost filled with a liquid;

FIG. 5 is a view showing the tube after the step of ultrasonically sealing an upper band seal to close the package;

FIG. 6 is a view showing the package after it has been cut across the top to free it from the upper portion of the tube;

FIG. 7 shows a diagramatic view of ultrasonic welding apparatus in its initial position with a tube positioned between the horn and anvil of the ultrasonic welding apparatus;

FIG. 8 shows the horn and anvil in contact with the tube;

FIG. 9 shows the horn and anvil exerting compressive forces on the tube and ultrasonically welding a band seal across the tube;

FIG. 10 shows the horn and anvil in retracted position after completing the ultrasonic welding operation;

FIG. 14 shows a tube made of flexible material in the form of a first straw;

FIG. 15 shows the tube of FIG. 14 twisted so as to form a bend;

FIG. 16 shows a view of the straw of FIG. 14 twisted to make two bends and sealed at the ends and at the bends to form three compartments each containing a solid-form product;

FIG. 17 shows a second straw, similar to the first straw of FIG. 14, with its lower end sealed by an ultrasonic band seal and containing three tablets;

FIG. 18 shows the second straw after a step of making a transverse bend and ultrasonic seal across the second straw above the first tablet; and FIG. 19 shows the completed package with a transverse bend and ultrasonic seal across the second straw above the second tablet, with the top of the straw being ultrasonically sealed to form a package with three individual compartments each containing a tablet, and with the seals extending transversely across the extruded-plastic tube at right angles to the axis of the tube.

DETAILED DESCRIPTION OF THE PREFERRED EMBODIMENTS

Figure 11:
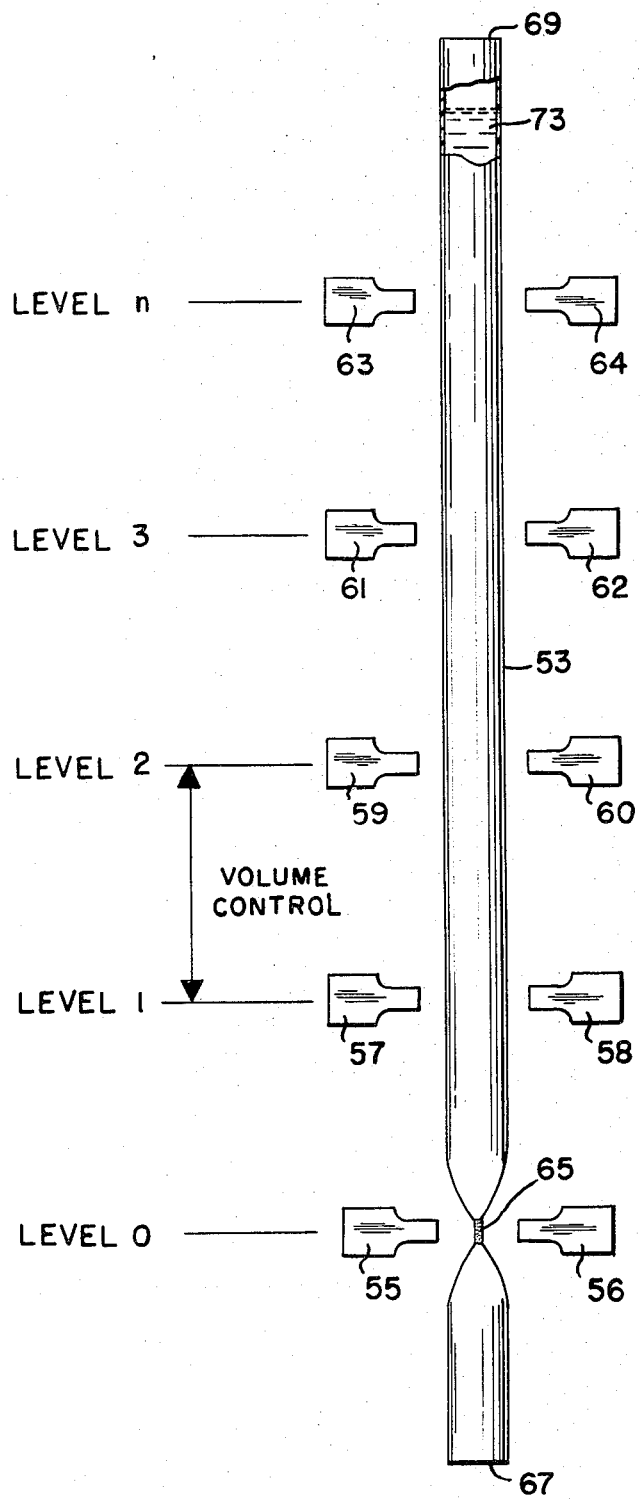
FIG. 11 shows diagramatically another ultrasonic welding apparatus which includes a plurality of horn and anvils arranged in a series.

Turning now to the drawings, there is shown, in FIGS. 1 through 6, a tube 21 having a bottom end 23 and a top end 25, and made of extruded-plastic flexible material which may be in the form of a large soda straw. Tube 21 may be opaque or it may be clear so that its contents are visible.

In accordance with the method of my invention, a bottom band seal 27 is ultrasonically sealed across bottom end 23 of tube 21 as in FIG. 2. Then tube 21 is filled with a liquid 29 starting at the bottom end 23 of the tube 21 so as to exclude gas from the liquid 29 as it is filling the tube, and so as to push out of the tube 21 the initial gas that is being replaced by the liquid 29. To accomplish this, as shown in FIG. 3, a hollow needle 31 is provided having a dispensing end 33 and a supply end 35 connected to a source of the liquid 29. Needle 31 is inserted into the tube 21 through top end 25 so that the dispensing end 33 of the needle 31 is very close to bottom end 23 of the tube 21 and is close to the bottom band seal 27. The liquid 29 is dispensed while withdrawing the needle 31 from the tube 21, with the dispensing end 33 of needle 31 being kept below the surface of the liquid 29 during the needle withdrawing step in order to exclude gas, which may be air, from the liquid 29 entering the tube 21. The advancing top liquid surface 37 pushes the initial gas in tube 21 out of the tube 21 as it is being filled.

When tube 21 is filled with liquid 29 to a desired depth, an upper band seal 39 is ultrasonically welded across tube 21 at a location spaced away from bottom band seal 27, below the level of the liquid 29 in the tube 21, and below the level of the dispensing end 33 of needle 31.

As shown in FIG. 5, upper band seal 39 is sealed in a plane perpendicular to the plane of the bottom band seal 27 so as to give the resulting package 41 a tetrahedral shape. A top 43 is formed on package 41 by cutting across tube 21 through the upper band seal 39.

In summary, in accordance with the method of my invention illustrated by FIGS. 1-6, I take a tube 21 made of flexible material and having a top end 25 and a bottom end 23, ultrasonically seal a bottom band seal 27 across bottom end 23 of the tube 21, insert contents such as liquid 29 into the bottom-sealed tube 21, and ultrasonically seal an upper band seal 39 across tube 21 at a location spaced away from the bottom end 23, with the contents being contained between the upper and bottom band seals 39, 27.

The ultrasonic welding apparatus used to make bottom and upper band seals 27, 39 is shown diagramatically in FIGS. 7 through 10, and includes a horn 45 having a piezoelectric transducer interface 47, and an anvil 49 facing horn 45 with tube 21 in between. The ultrasonic welding apparatus is of conventional design, and the energy horn 45 may be energized by a 25 KC, 3 KW source applied for about 0.1 second after plastic tube 21 is squeezed shut, as shown in FIG. 9, using about 500 pounds of force. This action applies an ultrasonic band seal 51, and the horn and anvil 45, 49 are then retracted as shown in FIG. 10.

FIG. 11 diagramatically illustrates a method of making a ribbon of liquid-filled packages out of a tube 53. A series of horn-anvils are provided in spaced apart relationship, with horn 55 and anvil 56 located at level 0, horn 57 and anvil 58 located at level 1, horn 59 and anvil 60 located at level 2, horn 61 and anvil 62 located at level 3, and horn and anvil 64 located at level "n".

The ultrasonic welding apparatus of FIG. 11 forms a ribbon of "flat" packs with bottom and upper band seals lying in the same plate, instead of in intersecting planes as in tetrahedral package 41 of FIG. 6.

If it is desired to form a ribbon of tetrahedral packages similar to package 41, the horn-anvil combinations of level 1 and 3 are positioned at right angles to their position shown in FIG. 11.

In operation, the horn-anvil sets operate sequentially, and the method of forming a ribbon of individual packages comprises the steps of taking the tube 53 having a bottom end 67 and a top end 69, ultrasonically sealing bottom band seal 65 across tube 53 by activating horn 55 at level 0, filling the straw 53 with a liquid 73 to almost the tube top end 69, and sequentially activating the horn-anvil sets at levels 1 through "n" to make a series of sealed packages in a ribbon form.

Figure 12:
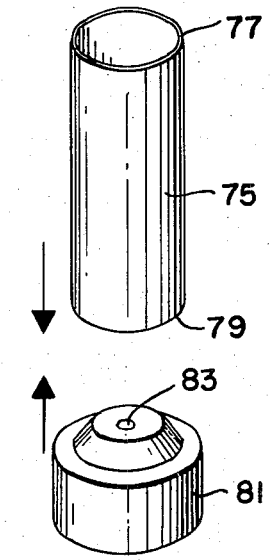
FIGS. 12 and 13 show diagramatically another filling apparatus for filling the tube with liquid from the bottom of the tube.
Figure 13:
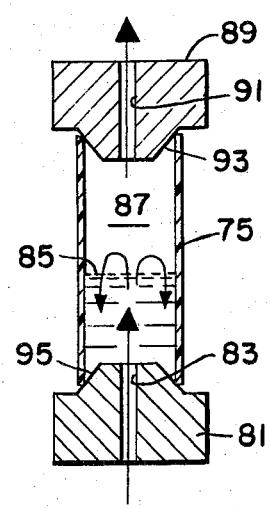

FIGS. 12 and 13 illustrate another embodiment of my invention in a method of making a package having contents, and comprises the steps of taking a tube 75 of flexible material having a top end 77 and a bottom end 79, placing the bottom end 79 of tube 75 onto a bottom plug 81 having a dispensing channel 83 for dispensing a liquid 85 into the tube 75 and displacing therefrom a gas 87 such as air, placing a top plug 89 having an exhaust channel 91 onto the top end 77 of tube 75, and dispensing liquid 85 into the tube 75 through the dispensing channel 83 and exhausting the gas 87 through the exhaust channel 91 until the tube 75 is filled with the liquid 85 and emptied of the gas 87.

Alternatively, instead of forcing the gas 87 from the tube 75 by the insertion of the liquid 85, and gas 87 may be exhausted by attaching vacuum means to the exhaust channel 91 and creating a vacuum inside tube 75 prior to the insertion of the liquid 85.

Top plug 89 is provided with a downwardly tapered cone surface 93 that tapers downwardly and inwardly, and bottom plug 81 is provided with a conical surface 95 that tapers upwardly and inwardly, and the upper and lower edges of tube 75 are firmly in contact with these tapered surfaces 93, 95 so as to securely seal the top and bottom of tube 75 during the filling operation, even though the dimensions of the top and bottom edges of straw 75 may vary somewhat due to manufacturing tolerances.

After the tube 75 has been filled with the liquid 85, top and bottom ultrasonic band seals are ultrasonically welded onto the tube 75 to seal the contents in the package.

In the embodiment of FIGS. 12 and 13, the diameter of tube 75 may be small, about 0.4 of an inch or less, and the length of tube 75 may be about 13 inches. The liquid 85 may require that tube 75 be degassed before the liquid is inserted into the tube, where the liquid 85 comprises certain drugs of chemicals sensitive to oxidation, for example. The tube 75 is strong enough to withstand a controlled amount of vacuum to prevent tube 75 from collapsing while it is being degassed. The top and bottom ultrasonic band seals, welded onto the tube 75 to seal its contents, are ultrasonically welded onto tube 75 at a distance from the top and bottom of tube 75, and the ends of the tube above and below the ultrasonic band seals may be discarded.

FIGS. 14 through 16 illustrate another embodiment of the invention in a method of making a package having contents, comprising the steps of taking a tube 97 of flexible material in the form of a first straw and having a top end 99 and a bottom end 101, inserting tablets 103, 104 and 105 into tube 97, bending the tube 97 between tablets to form bends 107, 109, ultrasonically sealing bends 107, 109 to form three compartments 111-113 for the three tablets 103-105, and ultrasonically sealing the ends 99, 101 of tube 97 to form upper band seal 115 and lower band seal 117 to create a three-compartment, contents-filled package 119.

FIG. 15 shows tube 97 with a bend 121 that is formed by twisting tube 97 by applying opposite twisting forces to the upper and lower portions of tube 97.

FIGS. 17-19 show a contents-filled package 123 with three compartments 125-127 formed by top end ultrasonic band seal 129, ultrasonic bend seal 130, ultrasonic bend seal 131, and bottom end ultrasonic band seal 132. The bend seals 130 and 131 of FIG. 19 differ from the bend seals 107 and 109 of FIG. 16 in that the bends 130, 131 are made at right angles to the axis of second straw 133 from which package 123 is made so that compartments 125-127 completely overlie each other, while bend seals 107-109 of FIGS. 14-16 are at angles other than right angles to the axis of straw 133 so that the compartments 111-113 do not completely overlie each other.

I claim:

1. A method of making a package having contents, comprising the steps of
    taking a tube of flexible material having a top and a bottom end,
    ultrasonically sealing a bottom band seal across the tube,
    inserting the contents into the tube,
    and ultrasonically sealing an upper band seal across the tube at a location spaced away from the bottom end of the tube,
    with the contents contained between the upper and bottom band seals,
    the contents-inserting step comprising inserting tablets or the like into the tube, and said method including the further steps of folding the tube across itself between tablets to form fold lines in the tube, and ultrasonically sealing said fold lines to form compartments for a series of tablets.

2. The method of claim 1, including bending the tube at right angles to the axis of the tube.

3. The method of claim 1, including bending the tube at an angle other than a right angle to the axis of the tube.

4. The method of claim 1 wherein the tube is made of extruded-plastic flexible material in the form of a straight straw of a finite length.

5. The method of claim 4 in which there are at least three tablets inserted in the tube.

6. A method of making a package having contents, comprising the step of taking a tube of flexible material having a top and a bottom end, ultrasonically sealing a bottom band seal across the tube, inserting liquid contents into the tube with the tube held in an upright position, and ultrasonically sealing an upper band seal across the tube at a location spaced away from the bottom end of the tube, with the contents contained between the upper and bottom band seals, said inserting step including placing the tube onto a bottom plug having a dispensing channel for dispensing liquid into the bottom of the tube, placing a top plug having an exhaust channel onto the top of the tube, and dispensing liquid into the tube through the dispensing channel and exhausting gas through the exhaust channel until the tube is filled with the liquid and emptied of the gas.

* * * * *